United States Patent Office 2,801,377
Patented July 30, 1957

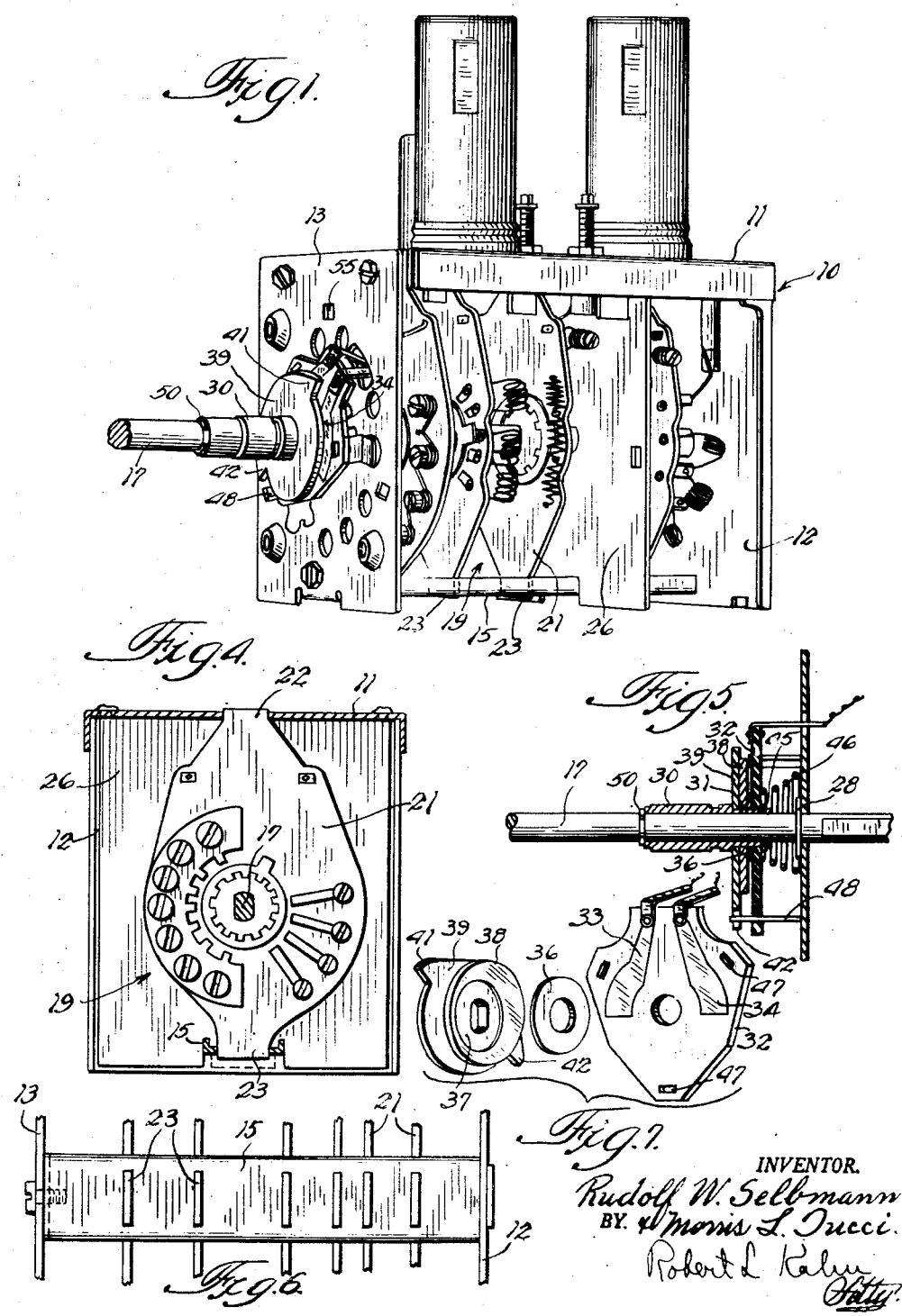

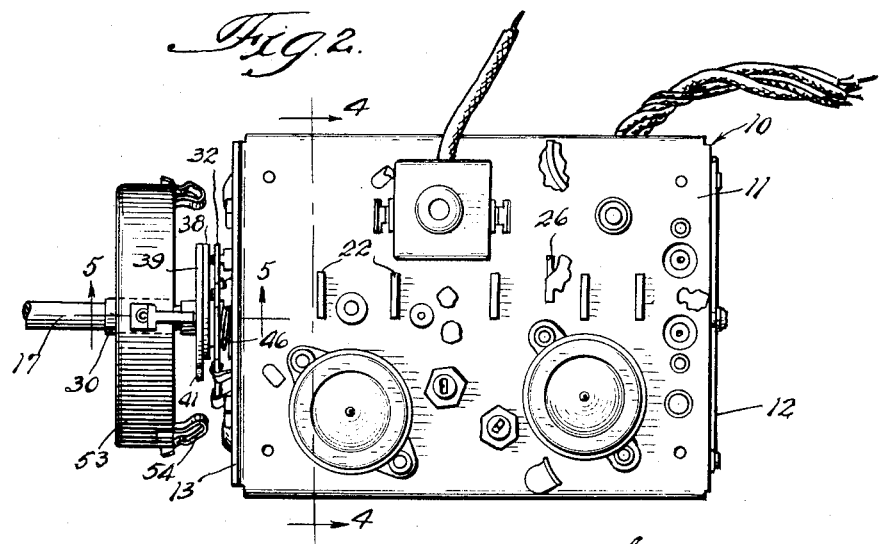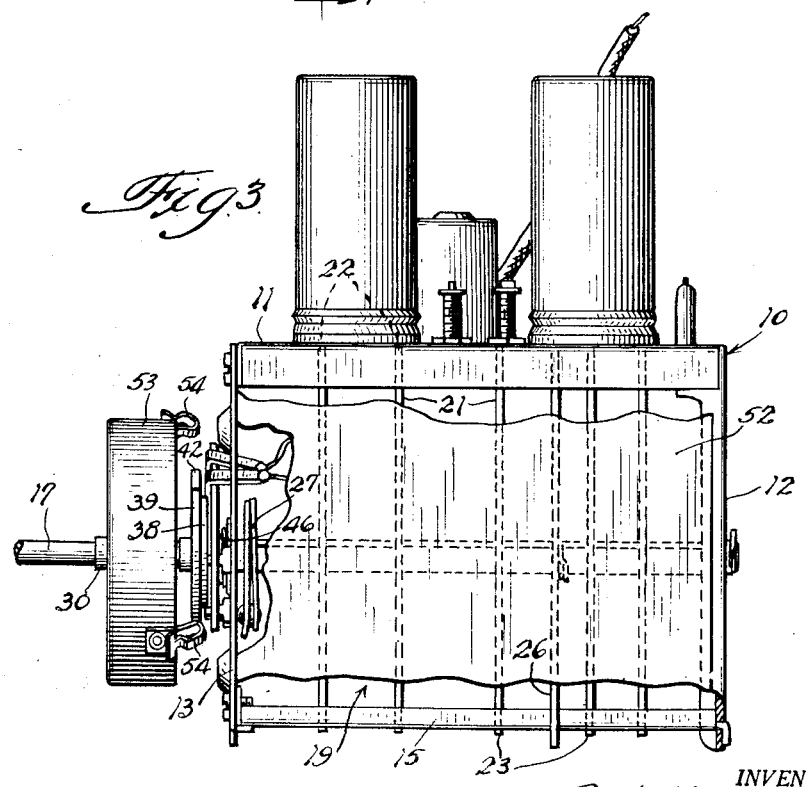

2,801,377

VERNIER CONDENSER

Rudolf W. Selbmann, Jamaica, and Morris L. Tucci, Brooklyn, N. Y., assignors to Oak Mfg. Co., a corporation of Illinois Application March 9, 1954, Serial No. 415,139

2 Claims. (Cl. 317—249)

This invention relates to a vernier condenser which may be used on a television tuner and is particularly useful in a rotary switch type of television tuner. As is well known, such a tuner comprises a number of switch sections, such as for example, as illustrated in United States Patent No. 2,186,949, issued January 16, 1940, associated with suitable index means. Each stator switch section has suitably wired thereto inductances, capacitors and the like so that in each index position, suitable resonant circuits for the particular television channel are provided. Such tuners are well known and widely used. Such a tuner is illustrated in United States Patent No. 2,551,228, issued on May 1, 1951.

In order that the invention may be understood, it will now be explained in connection with the drawings wherein an exemplary embodiment is illustrated, it being understood that variations are permissible within the scope of the appended claims.

Figure 1 shows a perspective view of a tuner, the cover plates being removed, the tuner being provided with the new vernier condenser.

Figure 2 is a top plan view of the tuner of Figure 1, the cover plate for the vernier condenser being spaced from the tuner.

Figure 3 is a side elevation of the tuner, the cover plate for the tuner being omitted and the switch sections being simplified.

Figure 4 is a section on line 4—4 of Figure 2.

Figure 5 is a sectional detail of the vernier condenser.

Figure 6 is a bottom detail of the tuner.

Figure 7 is an exploded view of the components of the vernier condenser.

The tuner comprises a relatively heavy metal base plate generally indicated by 10 and having a generally U shape. While it is possible to make base plate 10 of one piece, it is more convenient to have tube shelf 11 and rear panel 12 in one piece while having front plate 13 separate but rigidly attached to tube shelf 11 as by bolts, spot welding or the like. The bottom of the frame is provided with reinforcing bar 15 extending across the frame from the front to the rear panels and rigidly attached to the edges of the panels.

Tube shelf 11 carries a number of tube sockets for vacuum tubes and also may carry miscellaneous trimmer screws and test points in accordance with conventional practice.

Suitably journaled in plates 12 and 13 is shaft 17. Shaft 17 carries a number of switch rotor sections generally indicated by numeral 19, such rotor sections having the necessary contact construction to accomplish the desired switching action.

Each switch section includes a stator generally indicated by numeral 21. Each switch stator section 21 is formed of insulating material and carries stationary contacts and circuit elements as generally illustrated in the drawing. Each insulating stator element 21 is elongated and has wing portions 22 and 23. These wing portions extend through slots in tube shelf 11 and reinforcing bar 15 respectively. Thus each stator switch insulating member is rigidly supported between the top and bottom of the tuner frame.

As illustrated here, there are some five switch sections, two of which are disposed in one compartment and three disposed in another compartment. Between the two compartments is metal shielding plate 26 extending between tube shelf 11 and supporting bar 15. As described in the aforementioned switch patent, each rotor section floats upon the shaft having flattened portions for rotatively coupling the shaft to a switch rotor. By virtue of this construction, a compact tuner results, the distance between the tube shelf and the supporting bar being reduced to a minimum, thus reducing the length of leads and wiring, all of which are important at television frequencies.

Suitable index means 27 cooperate with index indentations in front plate 13. Shaft 17 is rotatably locked to a portion of the index means in the usual manner and the shaft is longitudinally locked to the index means by a C washer 28 disposed immediately in front of front plate 13 of the frame. Thus shaft 17 is rotatable in the frame but is restrained against longitudinal movement, this construction being well known.

Concentric with shaft 17 is a vernier condenser for fine tuning. This vernier condenser usually has the plates connected to the oscillator circuit of the tuner so that the oscillator frequency may be varied over a limited range for the purpose of precisely tuning a desired television channel. The vernier condenser provided here is a compact self-contained assembly whose capacitance may be predetermined precisely without requiring extreme precision in the manufacture or mounting of the condenser.

The vernier condenser assembly includes sleeve 30 adapted to slide over shaft 17. Sleeve 30 may be of any suitable material and may conveniently be of brass, as an example. Sleeve 30 has reduced portion 31 over which is loosely disposed stator insulating support plate 32. Stator plate 32 supports stator condenser plates 33 and 34 of flat sheet metal either molded in or cemented to the surface of stator insulating support plate 32. Plates 33 and 34 may have any desired shape and are connected by suitable terminals to the oscillator system or any other part of the tuner for the purpose of obtaining fine tuning. Loosely disposed over sleeve reduced portion 31 is insulating washer 36. Washer 36 is the only element in the vernier condenser requiring any accuracy, the thickness of this washer determining the spacing between the movable and stationary parts of the condenser. Washer 36 may be of any suitable material, such as fiber, paper, or the like, and may easily be manufactured to a desired thickness within close tolerances.

Rotor support plate 37 carrying rotor condenser plate 38 and rotor actuating member 39 is rotatively locked to sleeve portion 31, as for example by having sleeve portion 31 and apertures through parts 37 and 39 noncircular. The shoulder formed by sleeve 30 acts as a stop for member 39. Rotor actuating member 39 has ears 41 and 42 disposed generally diametrically opposite to each other and extending outwardly, these ears functioning to limit the rotation of the rotor to approximately 180°.

The vernier condenser assembly is maintained loosely intact by having an annular slot in sleeve portion 31 where it projects beyond stator support plate 32. Disposed in the annular slot is C washer 45, the washer being large enough to engage the rear part of stator support plate 32 and prevent the stator plate from being pulled off the sleeve.

The vernier condenser assembly thus described is complete and may be tested as a complete unit independently of its mounting in the tuner. It is only necessary when testing to spring press stator support plate 32 against rotor support plate 37 to be sure that the minimum separation between the plates as determined by the thickness of washer 36 takes place.

Before sliding the vernier assembly into position over shaft 17, coil spring 46 is disposed around the shaft in front of front panel 13. Then the vernier assembly is passed over shaft 17 into position. Stator support plate 32 is rotatively locked against rotation by having a number of apertures 47 engage suitable lugs or fingers struck up from plate 13. These lugs or fingers are adapted to pass through apertures 47, support plate 32 being readily rockable or movable along the length of the locking lugs. One lug 48 for rotatively locking stator plate 42 is long enough to project into the path of travel of ears 41 and 42 during the circular movement of the rotor plate and thus functions to limit the rotation thereof.

The vernier condenser assembly is maintained longitudinally of shaft 17 and against spring 46 by C washer 50 disposed in a suitable slot in shaft 17. The arrangement is such that spring 46 is compressed and urges stator support plate 32 against the rotor members. Thus any working of the support plates for either the stator or the rotor condenser plates will have negligible effect upon the operation of the condenser for the reason that the spacing between plates is determined primarily by the thickness of washer 36.

The tuner housing is completed by a generally U-shaped sheet metal plate 52 having suitable flanges overlapping the various edges to provide complete shielding and enclosure for the tuner. In addition, a circular generally cup shaped cover 53 is provided for shielding the vernier condenser. Cover 53 may be provided with spring clips 54 engaging suitable slots 55 in front plate 13 for the purpose of retaining the shield in position. Vernier shield cup 53 is suitably apertured to clear sleeve 30.

What is claimed is:

1. A vernier condenser assembly adapted for use in connection with an electrical device, said vernier assembly comprising a sleeve carrying a rotor support plate rotatively coupled thereto, said rotor support plate carrying a rotor condenser plate, an insulating washer loosely disposed on said sleeve adjacent said rotor condenser plate, a stator support plate loosely disposed on said sleeve beyond said washer, said stator support plate carrying at least one stator condenser plate on its front face for cooperation with said rotor condenser plate, means on said sleeve beyond the stator support plate rear face for loosely maintaining said stator support plate and washer on said sleeve in proper relation to said rotor support plate, said assembly being adapted to be disposed on a shaft or other rod-like member with a spring around said shaft pressing against the rear face of the stator support plate, said shaft also being adapted to have means for locking the sleeve against longitudinal movement in a direction away from the spring, said spring being compressible between the stator support member and a frame part of the electrical apparatus whereby the minimum spacing between the stator and rotor condenser plates will be maintained.

2. The construction according to claim 1 wherein said stator support member is provided with at least one aperture eccentric of the sleeve center for engaging a locking member on the frame of the apparatus to prevent rotation of the stator member, said locking member being long enough to extend to the rotor support member, said rotor support member having at least one extension for engaging said locking member to limit the rotary travel of said rotor support member.

References Cited in the file of this patent

UNITED STATES PATENTS

| | | |
|---|---|---|
| 2,177,483 | Hall | Oct. 24, 1939 |
| 2,186,949 | Allison | Jan. 16, 1940 |
| 2,503,579 | Fisher | Apr. 11, 1950 |
| 2,551,228 | Achenbach | May 1, 1951 |
| 2,562,263 | Ehrlich | July 31, 1951 |
| 2,584,120 | Fyler | Feb. 5, 1952 |
| 2,585,844 | Romero | Feb. 12, 1952 |
| 2,598,247 | Frihart | May 27, 1952 |
| 2,620,378 | Thias | Dec. 2, 1952 |